United States Patent [19]
Chui

[11] 3,930,825
[45] Jan. 6, 1976

[54] METHOD OF LASER BEAM CUTTING OF A RIBBON OF HOT GLASS

[75] Inventor: Granger K. Chui, Dearborn Heights, Mich.

[73] Assignee: Ford Motor Company, Dearborn, Mich.

[22] Filed: Nov. 29, 1974

[21] Appl. No.: 528,522

[52] U.S. Cl. .......................... 65/62; 65/97; 65/105; 65/174
[51] Int. Cl.² ......................................... C03B 21/02
[58] Field of Search .......... 65/62, 97, 98, 105, 112, 65/113, 174, 176

[56] References Cited
UNITED STATES PATENTS

| | | | |
|---|---|---|---|
| 3,352,015 | 11/1967 | Galabert et al. | 65/174 X |
| 3,453,097 | 7/1969 | Häfner | 65/112 |
| 3,589,883 | 6/1971 | Dear | 65/97 |
| 3,684,473 | 8/1972 | Ritter, Jr. | 65/104 |

*Primary Examiner*—Arthur D. Kellogg
*Attorney, Agent, or Firm*—William E. Johnson; Keith L. Zerschling

[57] ABSTRACT

This application teaches a method of producing an article of glass by cutting it out of a sheet of flat glass. Flat glass is formed in a glass ribbon forming apparatus and is discharged therefrom at a temperature in excess of 1000°F. The hot flat glass is moved under at least a pair of focused laser beams which cut patterns in the glass having a common starting and ending point. In such a manner, a glass article is cut from the ribbon. The article is removed from the remaining portion of the ribbon and cooled in a controlled manner to produce a final glass article. The cooling operation may be rapid or slow so as to produce a tempered or an annealed article.

6 Claims, 5 Drawing Figures

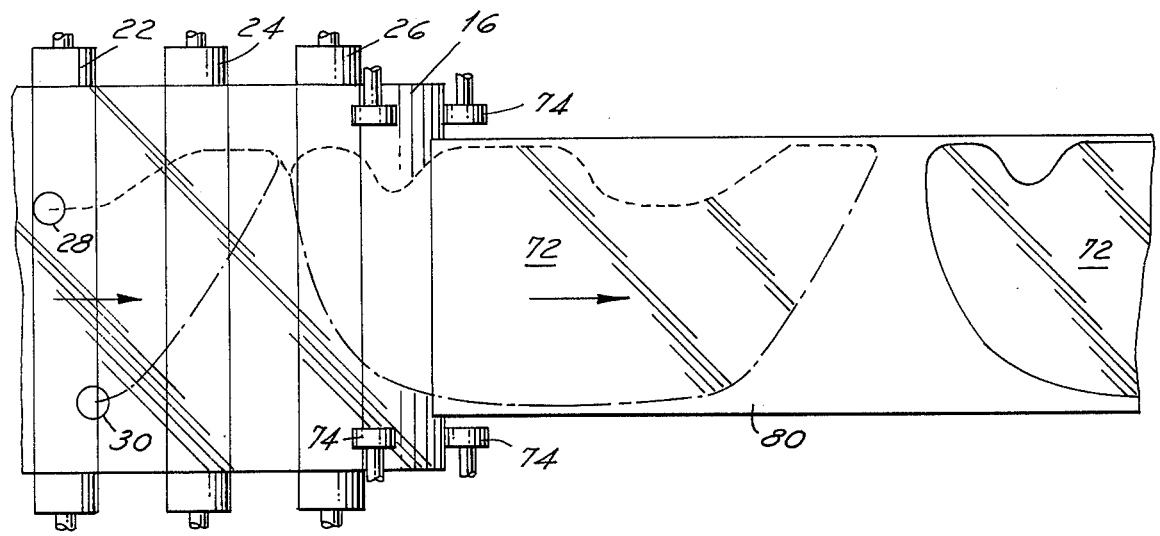
FIG. 3
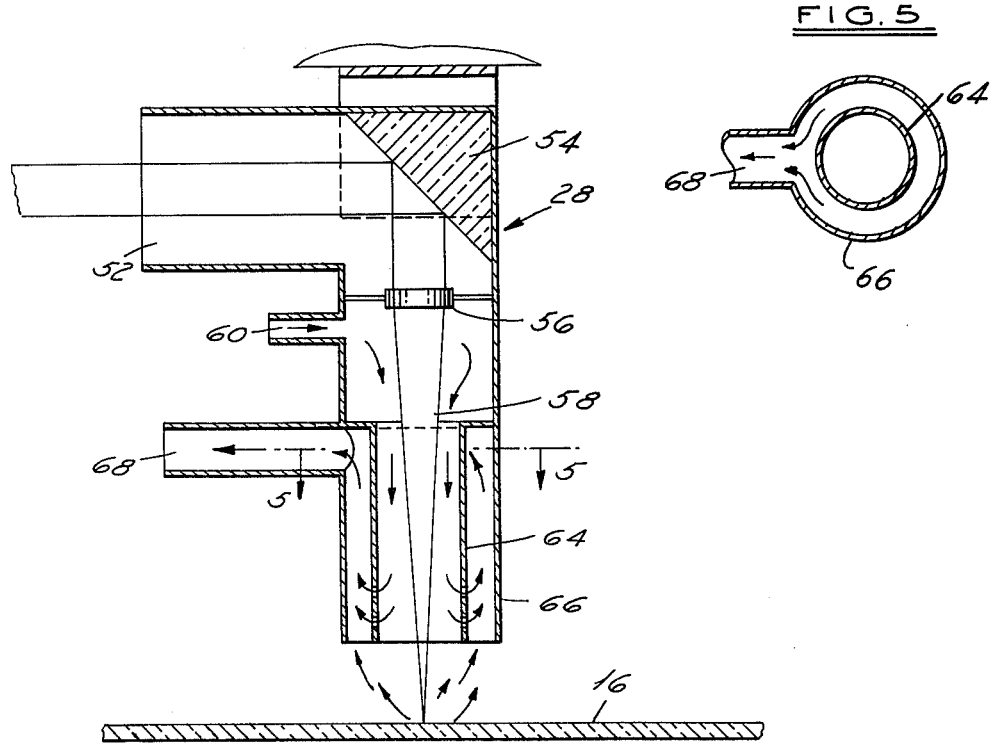
FIG. 4
FIG. 5

METHOD OF LASER BEAM CUTTING OF A RIBBON OF HOT GLASS

BACKGROUND OF THE INVENTION

In recent years the float process of manufacturing flat glass has been adopted by the glass industry for the manufacture of flat glass. The process produces a continuous ribbon of glass delivered from a float glass chamber at an elevated temperature. The glass ribbon is moved through an annealing lehr in which the glass is cooled in a controlled manner to obtain stresses suitable for cutting the ribbon. When the glass is cooled to room temperature, it is cut into rectangular brackets. These brackets are subsequently cut by off-line cutting devices to produce flat glass articles such as windows for automotive vehicles. The flat glass articles are heated and subjected to a shaping operation to shape them into curved configurations. Such heated articles may be quenched from the higher temperature in order to temper the glass.

My copending U.S. Pat. application Ser. No. 484,903, filed July 1, 1974 and entitled "Method of Cutting Glass," now U.S. Pat. No. 3,885,943, issued May 27, 1975 teaches a method of cutting flat glass as it emerges from the float glass manufacturing process prior to entering into an annealing lehr. My copending application is hereby incorporated into this application by reference. The application discloses the use of a single laser device for making cuts across a continuous ribbon of glass emerging from a float bath chamber in order to cut the ribbon into individual blocks of glass which subsequently may be processed through an annealing lehr to produce a finished block of glass. That application teaches that there is a specific relationship between the rate at which the glass ribbon may be cut, the power of the laser and the thickness of the glass.

It is object of this invention to provide a method for producing a final shape of an article of glass in which it is not necessary to reheat the glass in order either to bend and/or temper it. It is a further object of this invention to use the heat already found in a ribbon of glass produced by the float process for shaping and/or tempering glass articles produced therefrom.

SUMMARY OF THE INVENTION

This invention relates to a method of forming an article of glass and, more particularly, to a method of forming an article of glass in which the article is cut directly from a continuous ribbon of glass, bent, if required, into a shape desired and cooled in such a manner as to produce a final glass article having the characteristics desired.

In accordance with the teachings of the method of this invention, glass forming materials are melted and formed into a ribbon of flat glass in a glass ribbon forming apparatus. The flat glass is withdrawn from the ribbon forming apparatus with the temperature thereof being in excess of 1000°F. The hot flat glass is moved under at least a pair of focused laser beam devices which project laser beams onto the glass ribbon capable of cutting through the hot glass. The laser beam devices are moved in a controlled manner toward and away from one another as the hot flat glass moves thereunder so that one laser beam cuts out a first side portion of the article of glass and the other laser beam cuts out a second side portion of the article of glass thereby to shape the article of glass. The so-produced article is removed from the rest of the glass ribbon and cooled in a controlled manner to produce a final glass article. If desired, prior to cooling, the glass may be shaped or bent, such as by placing a radius of curvature therein, by many of the different types of the devices already known in the art. Also, the cooling of the article can be controlled so that it occurs rapidly enough to produce a tempered glass article or, in the alternative, slow enough so that the completed article is annealed.

BRIEF DESCRIPTION OF THE DRAWINGS

FIG. 3 is a schematic, plan view of a portion of the apparatus shown in FIG. 1.

FIG. 4 is a detailed drawing showing a focused laser beam device employed in the apparatus of FIG. 1.

FIG. 5 is a view taken along line 5—5 of FIG. 4 showing the laser cutting device in greater detail.

BRIEF DESCRIPTION OF THE PREFERRED EMBODIMENT

Figure 1:
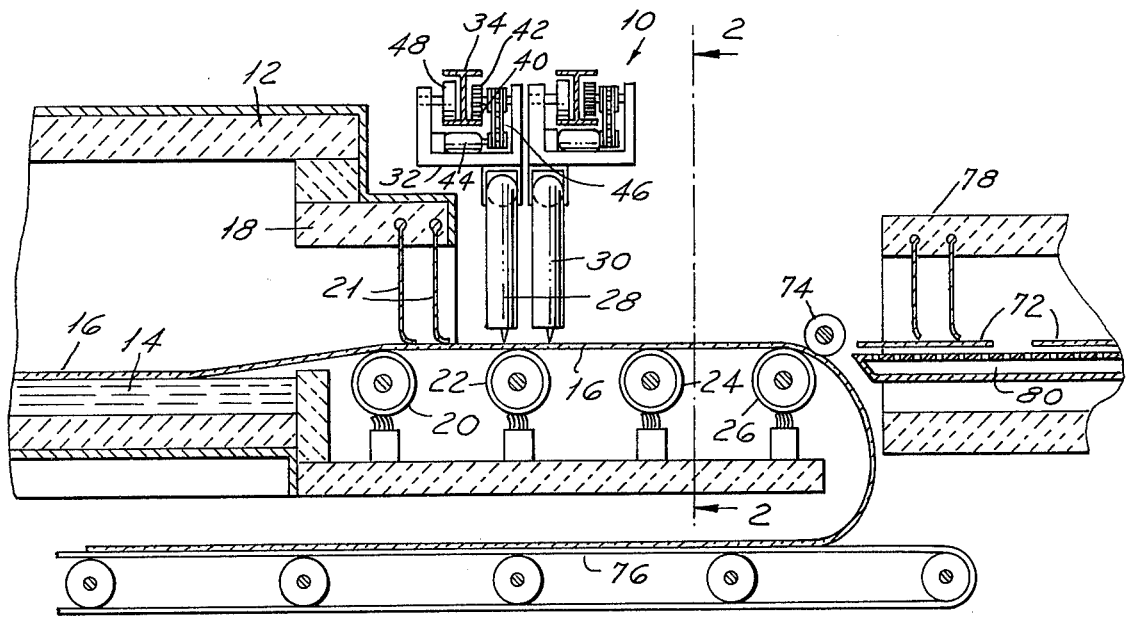
FIG. 1 is a side elevation view, partly in cross-section, showing the general details of apparatus in which the process of this invention is employed.

Referring now to FIG. 1, there is seen an apparatus, generally designated by the numeral 10, which is capable of performing a method in accordance with the teachings of this invention. In a known manner, glass forming materials are melted in a glass melting furnace (not shown) and delivered to a float glass chamber 12. The chamber contains a bath of molten tin 14 upon which a ribbon of glass 16 is formed. At an exit end 18 of the chamber the glass ribbon is lifted from the tin bath by an exit roll 20. Drapes 21 are provided to keep both the heat and the protective atmosphere of the float chamber contained therewithin. The glass ribbon exiting from the chamber has a temperature in the range from 1000°F to 1250°F. Conveying rolls 22, 24 and 26 are provided for conveying the glass ribbon away from the chamber.

Mounted outside of the float glass chamber 12 at its exit end 18 are a first laser cutting device 28 and a second laser cutting device 30. The laser cutting devices are constructed in an identical manner such as illustrated in FIG. 4 which shows the first device 28 in detail.

The laser devices 28 and 30 are identical so only one device will be described. In the case of the first laser cutting device 28, its supporting structure is identified by the numeral 32. An I-beam 34 is mounted by posts 36 and 38 so that the I-beam extends across the path travel of the glass ribbon 16 near the exit end 18 of the float glass chamber 12. The I-beam has a rack 40 extending across one side of its lower portion. This rack is engaged by a pinion 42 which, in turn, is driven by a motor 44 operating through drive belts 46. Electrical signals developed from a suitable control device, deliver electrical pulses to the motor 44 to operate the drive belt 46 to drive the pinion over the rack and thereby position the first laser cutting device 28 at any selected position along its path of travel. A support wheel 48 is also rotatably connected to the support structure 32 so as to help in supporting the weight of the first laser cutting device on the I-beam. The second laser cutting device is supported in an identical manner on another I-beam for movement thereacross. Thus the two laser cutting devices are independently movable in response to signals developed by any suitable control device. In any known manner, the control device produces signals which cause the motors to drive the laser cutting devices back and forth over the support I-beams.

Figure 2:
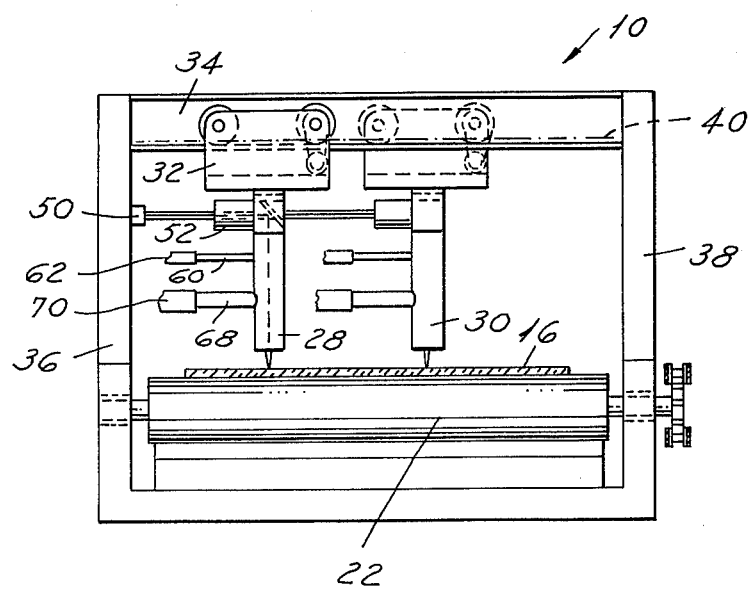
FIG. 2 is a side elevation view taken along line 2—2 of FIG. 1.

Reference is now made to FIGS. 2, 4 and 5 in order to understand the construction of the laser cutting devices. A laser beam is generated in a laser beam generating device (not shown) and projected by a lense system 50 mounted on the post 36 into a beam receiving opening 52 of the first laser cutting device 28. A 45° prism 54 redirects the beam to a focusing lens which, in turn, develops a focused beam 58 which is directed downwardly onto the hot glass ribbon 16. The operating conditions necessary in order to have a laser beam cut glass are discussed in my aforementioned patent application Ser. No. 484,903, which has been incorporated herein by reference.

A shielding gas atmosphere is delivered through a gas inlet 60 telescopically interfitting with a gas atmosphere delivery system 62. The shielding gas is directed downwardly to the area of beam cutting by a channeling member 64. The shielding gas and the vapor and dust accompanying the laser burning operation are brought upwardly between the channeling member 64 and an outside housing 66 to an exhaust port 68 which, in turn, is telescopically interfitting with an exhaust duct 70. In this manner the focused laser beam 58 is effective to cut through the glass and the material generated as a result of that cutting is removed.

As is best seen in FIG. 3, the first and second laser cutting devices 28 and 30 respectively cut one or the other side portion of an article. For example, for the article illustrated, the laser cutting device 28 cuts the left hand side of the article as indicated by the continuous dashed line whereas the second laser device cuts the right hand side of the article as defined by the long and short line representation. During the cutting operation, the laser cutting devices are individually controlled and movable toward and away from one another so as to cut the particular shape desired. Since the devices have a common start and stop location in their cutting pattern, they cut the article entirely around its perimeter to free it from the remainder of the glass ribbon. An individual glass article 72 is defined once the glass cutting operation is completed.

As best understood by reference to FIGS. 1 and 3, cullet return rollers 74 are employed to strip the excess glass ribbon from the cut glass articles. This excess glass is looped downwardly and dropped on to a cullet return belt 76. This excess glass may be mixed with new glass batch feed materials and delivered to the glass melting apparatus for remelting.

As seen best in FIG. 1, the individual glass articles 72 are conveyed into a glass handling furnace 78. The glass articles are still at about the temperature they were coming from the chamber 12. The glass handling furnace 78 can be designed in any number of ways in order to process the glass articles as desired. For example, as shown in FIG. 1, the glass handling furnace 60 contains a gas hearth 80 over which the individual glass articles are moved. As is well known by those skilled in the art, such a gas hearth may be used to shape the glass by letting it sag into a configuration defined by the shape of the bed of the gas hearth unit. After the glass article has been bent into the desired shape, it may be rapidly quenched by an impingement of cold air thereon in order to temper the same. In such a manner, a tempered glass article is produced directly from the hot glass delivered from the float chamber. It is thus not necessary to reheat a glass bracket in order to shape and temper it. In such a manner, the heat required to reheat the article to bending and shaping temperatures is saved.

As an alternative, the individual glass articles entering the glass handling furnace 78 may be cooled slowly, with or without shaping, in order to produce a final article of annealed glass. Once again, the shaping of the glass, if carried out, can be accomplished without reheating of the glass.

A method has been described herein for producing a final glass article directly from the ribbon of glass produced by a flat glass manufacturing apparatus. Many modifications of this invention will be apparent to those skilled in the art in view of this specification. It is intended that all such modifications which fall within the true spirit and scope thereof included within the scope of the appended claims.

I claim:

1. A method of forming an article of glass comprising:
   melting glass forming materials;
   forming a ribbon of flat glass in a ribbon forming apparatus;
   withdrawing the flat glass from the ribbon forming apparatus with the temperature of the flat glass being in excess of 1000°F.;
   moving the hot flat glass under at least a pair of focused laser beam devices which project laser beams onto the glass capable of cutting through the hot flat glass;
   moving the laser beams in a controlled manner having at least a lateral component for each beam as the hot flat glass moves thereunder so that one laser beam cuts out a first side portion of the article of glass and the other laser beam cuts out a second side portion of the article of glass whereby a complete article shape is formed said laser beam paths having a common intersecting point at the beginning and end of each article;
   removing the excess of the flat glass not forming a part of the article; and
   cooling the glass article in a controlled manner to produce a final glass article.

2. The method of forming a glass article as defined in claim 1 wherein: prior to cooling the glass article is formed into an article having a curved configuration by a glass-shaping operation.

3. The method of forming a glass article as defined in claim 1 wherein: the cooling of the glass article takes place at a rapid rate to produce a tempered glass article.

4. The method of forming a glass article as defined in claim 1 wherein: the cooling of the glass article takes place at a slow rate to produce an annealed glass article.

5. The method of forming a glass article as defined in claim 2 wherein: the cooling of the glass article takes place at a rapid rate to produce a tempered glass article.

6. The method of forming a glass article as defined in claim 2 wherein: the cooling of the glass article takes place at a slow rate to produce an annealed glass article.

* * * * *